(No Model.) 2 Sheets—Sheet 2.

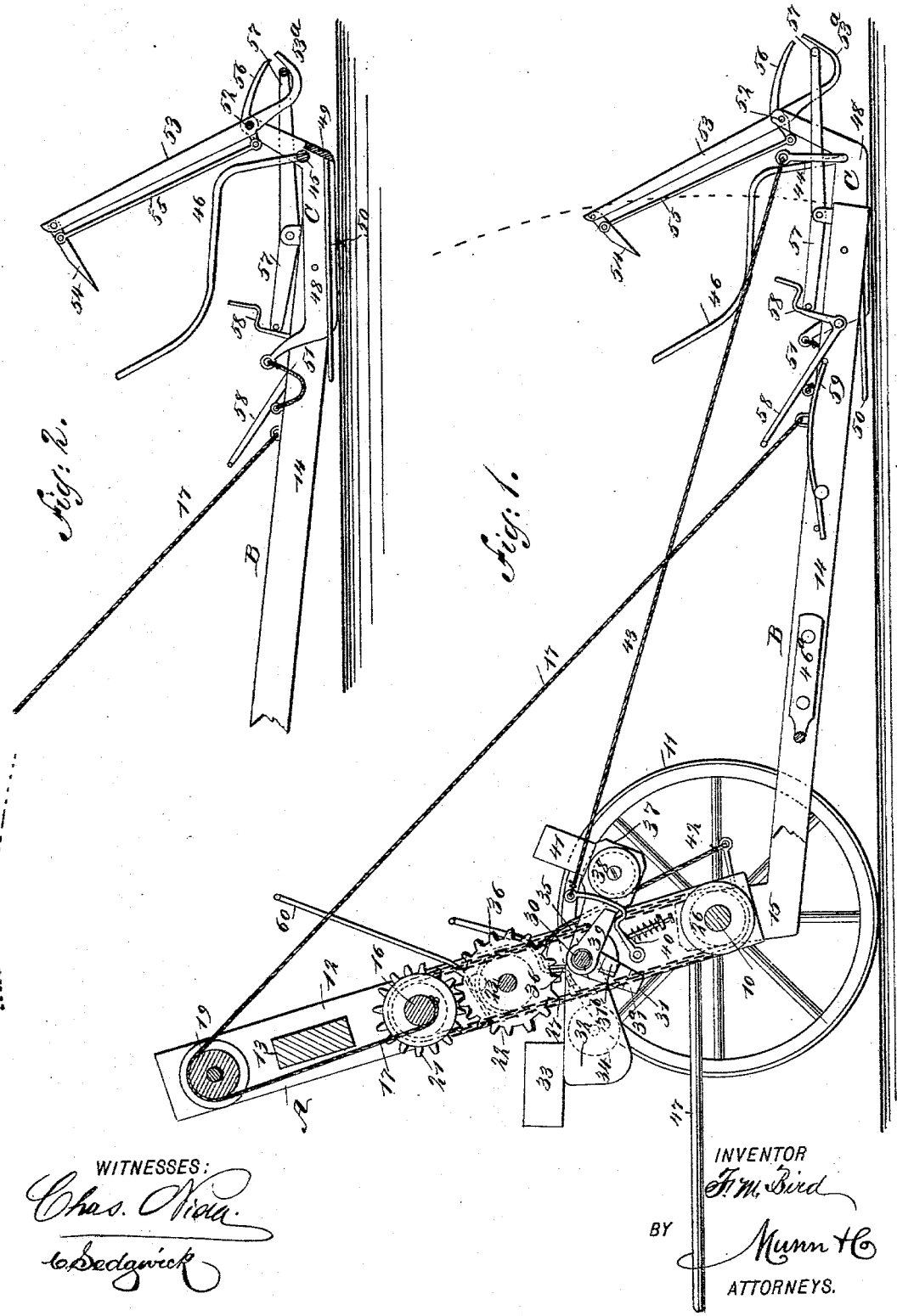

F. M. BIRD.
HAY LOADER.

No. 511,109. Patented Dec. 19, 1893.

WITNESSES:
Chas. Nida.
C. Sedgwick.

INVENTOR
F. M. Bird
BY
Munn & Co.
ATTORNEYS.

UNITED STATES PATENT OFFICE.

FLETCHER M. BIRD, OF WENATCHEE, WASHINGTON.

HAY-LOADER.

SPECIFICATION forming part of Letters Patent No. 511,109, dated December 19, 1893.

Application filed July 18, 1893. Serial No. 480,827. (No model.)

*To all whom it may concern:*

Be it known that I, FLETCHER M. BIRD, of Wenatchee, in the county of Kittitass and State of Washington, have invented a new and Improved Hay-Loader, of which the following is a full, clear, and exact description.

My invention relates to an improvement in hay loaders, and it has for its object to provide a hay loader which may be drawn over the cocks of hay, and which will gather up the hay in predetermined quantities, and wherein the loader will automatically act to raise the rake to such a position that it will be capable of delivering the hay into the wagon to which the loader may be attached, a trip mechanism acting automatically when the rake is in its position for delivering its contents, to open the rake and permit its contents to escape, and whereby also the loader will automatically act when the rake has been emptied, to lower the rake to receive another load.

A further object of the invention is to provide a hay loader which will be exceedingly simple, durable and economic and will be automatic in all of its movements.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 3:
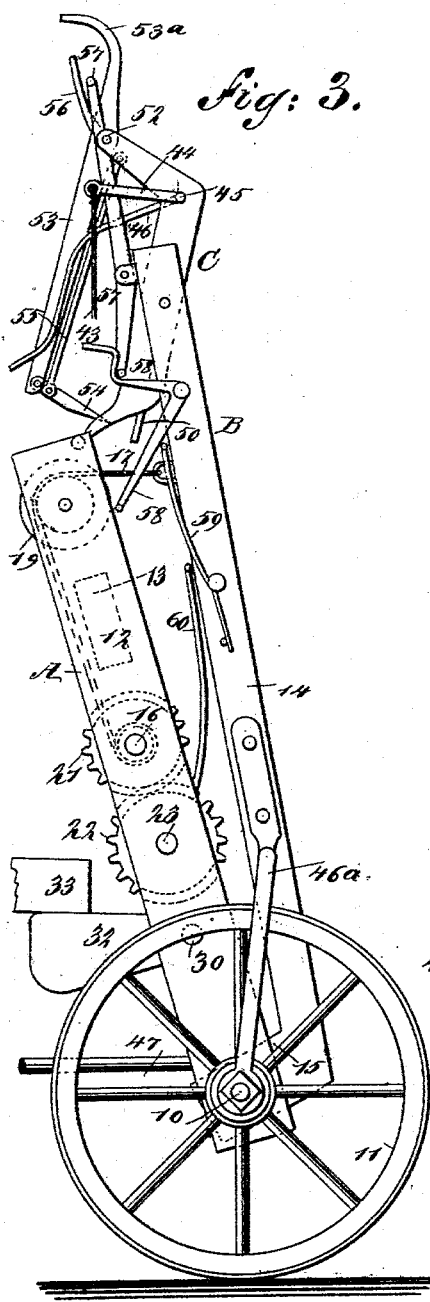
Figure 4:
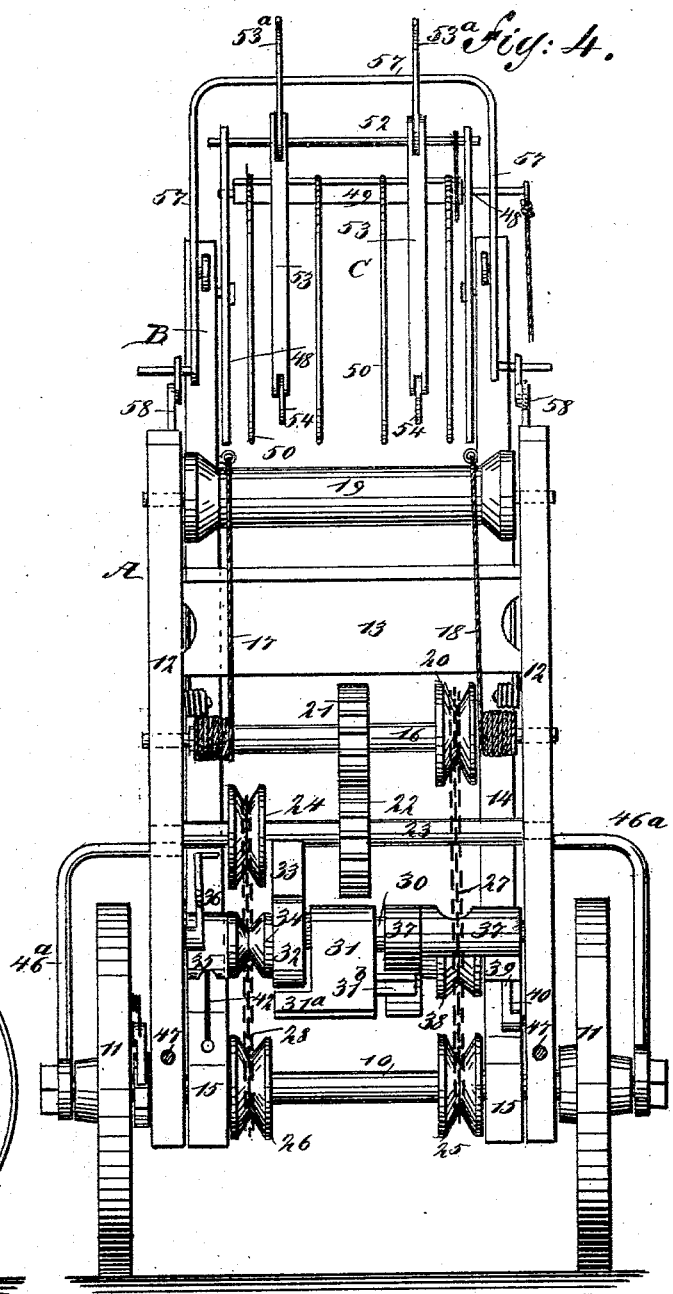

Figure 1 is a side elevation of the loading portion of the loader, and a vertical section through the body portion thereof. Fig. 2 is a vertical longitudinal section taken through the loading section of the loader. Fig. 3 is a side elevation illustrating the loading section as elevated and nearly in position to deliver its load, the same section being shown in its lower position in Fig. 1; and Fig. 4 is a front elevation of the loader when its parts are in the position shown in Fig. 3.

The axle 10 of the loader is revolved by means of two supporting wheels 11, secured to it one at each end. The body frame A of the loader is supported by the axle, and it consists practically of two uprights 12, which are pivotally attached to the axle, and a connecting board 13, located near the upper ends of the uprights. The loading frame B, is likewise pivoted upon the axle, and consists of two parallel side bars 14, each side bar being provided with a foot 15 at right angles to it, and the feet of the side bars are pivoted upon the axle 10.

I will first describe the mechanism carried by the body frame of the loader and the object of the same. A drum shaft 16, is journaled in the body frame below the connecting bar or board 13, and upon the said drum shaft two cables designated respectively as 17 and 18, are secured. These cables are adapted to be wound upon the shaft, and they extend upward at the front of the frame and rearward over a friction roller 19, journaled in the upper portion of the body frame; and the said cables 17 and 18, are secured at their rear ends to the side bars of the loading frame B near the rear ends of the latter, the attachment being made in any suitable manner. The drum shaft 16, carries near one end a pulley 20, which is firmly secured upon the shaft; and the shaft is further provided with a gear 21. The gear 21, meshes with a gear 22 immediately beneath it and secured upon the shaft 23 below and preferably parallel with the drum shaft. Thus the drum shaft will be revolved in one direction when turned through the medium of its pulley 20, and will be rotated in a reverse direction when turned through its gear connection with the shaft 23. The shaft 23 carries, near one end preferably, a pulley 24, the pulley being located diagonally opposite to the pulley 20 on the upper shaft. Two pulleys 25 and 26, are secured upon the axle ends, and the pulley 25, is connected with the pulley 20 by means of a belt 27, while the axle pulley 26 and the lower shaft pulley 24 are connected by a belt 28. Both of these belts are exceedingly loose, so much so that in the absence of a tightener, motion can not be communicated from the axle to either the shaft 23 or 16. Below the shaft 23 a third shaft 30, is journaled in the body frame. A cam 31, is journaled upon the central portion of the shaft 30, as shown in Fig. 4, and this cam comprises a body of block-like construction, which is loosely mounted upon the shaft, and two arms $31^a$ and $31^b$ projected in opposite directions from opposite faces of the body. At one side of the cam, over the forwardly-extending arm 31ª for example, an arm 32 is loosely mounted upon the shaft, and the said arm is provided with a weight 33 at its forward end, and the arm further carries upon one of its sides a pulley 34, which when the weighted arm at its weighted end is in its lower position will engage with the belt 28 and tighten said belt, so that the shaft 23, will be driven from the axle. The weighted arm 32, is provided with an extension 35, preferably semicircular as shown in Fig. 1, the cylindrical surface in one position facing the rear and the straight surface the front of the machine; and the weighted arm will be held in an elevated position, which is shown in Fig. 1, by means of a lever 36, fulcrumed upon one side of the machine, the lever being of angular construction, and its forward member being fitted to engage with the upper straight portion of the extension, whereby the weighted arm 32, will be maintained in its upper position. The extension 35 may be properly termed a keeper, and when the keeper 35 is locked by the lever 36, and the weighted arm 32 is in the upper position, the tightener pulley 34 will be held out of engagement with the chain 28. A second weighted arm 37, corresponding to the weighted arm 32, is loosely mounted upon the shaft 30 at the opposite side of the cam 31. The arm 37 extends rearwardly and is adapted to be engaged by the rear projection 31ᵇ of the cam near which it is located. The rearwardly-extending weighted arm 37, is provided with a tightener pulley 38, and this pulley is adapted for engagement with the belt 27, connecting the axle 10 with the drum shaft. When the weighted arm 37 is raised the tightener pulley is out of engagement with the belt, being brought into engagement with it only when the arm is in a lower position. The arm 37, at its outer end is provided with a stop or extension 39, shown in Figs. 1 and 4, the said stop or extension 39, being practically shaped as a straight pawl; and the stop 39 of the arm 37, is adapted to be engaged by a spring-controlled lever 40, and when engaged by the said lever the arm is held in an elevated position. The weight upon the arm 37 is designated in the drawings as 41. The stop or keeper 35 of the weighted arm 32 has secured to what is practically its upper surface one end of a cable 42. The cable extends downward over the cylindrical surface of the stop, and at its lower end the cable is secured to one of the shoes 15 of the loading frame B, as shown in both Figs. 1 and 4. The lever 40 controlling the stop or keeper 39 on the other arm 37, has attached to its free end one end of a cable 43, and the said cable is secured at its opposite end to a crank arm 44, attached to a shaft 45, which carries the movable teeth 46 of a rake C. The cam 31, and the weighted tightener arms 32 and 37, are adapted to control the movement of the drum shaft, and the operation is as follows: Supposing the loading frame B to be in the lower position shown in Fig. 1, which position it occupies when the rake is receiving hay, the levers 36 and 40, will at that time be in locking engagement with each of their keepers, and the tightener arms will be both in an elevated position, and both of the belts 27 and 28 will be so loose that the drum shaft can not be revolved from the axle. After the rake, which is to be hereinafter described, has received a load of predetermined amount, the lever 40, will be disengaged from the keeper 39 of the left-hand tightener arm, (viewing the machine from the back,) and that arm will drop, bringing its tightening pulley against the left-hand belt 27 and the arm in dropping will strike the rear extension 31ᵇ of the cam and force thereby the forward extension 31ª upward in a manner to insure the right-hand lever 36 engaging with its keeper 35, rendering the driving belt 28 idle. The drum shaft will now be revolved in a direction to elevate the loading frame, and when the frame has been elevated to a dumping position it will trip the lever 36 and release the keeper of the right-hand tightener arm, permitting it to drop, and in thus dropping it will press forward the cam 31 a sufficient distance to raise the left hand and rearwardly extending tightener arm a sufficient distance to bring its keeper in engagement with its lever, and the drum shaft will at that time receive movement from the shaft 23, which will be reversed as to its former position and movement, and the loading frame will be dropped downward to its loading position. When that position is reached the cable 42 will tighten and draw the keeper 35 of the right-hand and forwardly extending tightener arm to a position for locking engagement with its lever 36, and in this manner the loading frame will be alternately raised and lowered, raised when its rake is receiving its load, and lowered after the rake has dumped its load.

The outer ends of the axle 10 are usually braced by bracket arms or bars 46ª, attached to them and to the loading frame, being loosely mounted upon the axle and secured to the frame, and the body frame is provided with a forwardly extending tongue 47, by means of which it can be secured to the rear of any suitable vehicle.

The rake C, consists of a frame, said frame comprising two angular side plates 48, the horizontal members whereof are connected at one end by a cross bar 49, the vertical members being inclined to a greater or less degree. The frame of the rake is pivoted between its center and forward end between the outer side portions of the side beams of the loading frame, so that what may be termed the back of the rack frame, comprising its inclined side members and the connecting bar 49, extends beyond the outer end of the said loading frame. The lower teeth 50 of the rake are stationary, and are attached to the back of the connecting bar 49, while the shaft 45 carrying the movable teeth 46 of the rake, is journaled in the back portion of the rake frame, as shown in Fig. 2; and the crank arm 44, heretofore referred to as connected with the shifting lever 40, is attached to the said rake shaft 45. The teeth 46, which are secured to the shaft, are curved in such manner that they extend forwardly some distance above the fixed teeth, and are then curved decidedly upward. The frame of the rake is prevented from dropping down too great a distance at the back by connecting its forward end by means of cable 51 with the side bars of the loading frame. A shaft 52, is journaled in the upper ends of the inclined portion of the rake frame, and this shaft carries forwardly extending shields 53, which are secured to the shaft and extend in a forward direction between sundry of the movable teeth 46 of the rake. A finger 54, is pivoted in the forward end of each shield, which fingers are capable of being carried in longitudinal alignment with the shields, or at a right angle thereto, the shifting of the position of the fingers being accomplished through the medium of links 55, which are pivotally connected to the fingers and to levers 56, which levers are fulcrumed upon the shaft 52, and extend upwardly and rearwardly therefrom and in direction of upwardly curved heel sections 53$^a$, located upon the rear ends of the shields 53.

A trip yoke 57, is fulcrumed upon the side beams of the loading frame B, the body section of the yoke passing between the heels 53$^a$ of the shields 53 and the rearwardly extending portions of the levers 56; and the members of the yoke are adapted for engagement with angular lock levers 58, fulcrumed one upon each side of the loading frame, and the said levers are normally held in locking engagement with the yoke by means of a spring 59 of any description.

The operation is as follows: The loading frame B being in its lower position as above described, the engagement of its fixed teeth with the ground will cause it to incline upward at its rear end, thereby bringing the heels of the shields 53 in engagement with the yoke 57, and elevating the shields and the fingers carried thereby. As the rake receives its load, the movable teeth 46, will be pressed upward, and when the rake has received its complement the movable fingers of the rake will have turned the shaft upon which they are attached, and consequently the crank arm 44, to such an extent that it will draw upon the cable 43 and disconnect the shifting lever from the keeper of the left-hand tightener arm, thus causing the axle to revolve the drum shaft in a direction to elevate the loading frame and consequently the rake.

As the loading frame is elevated the rake will drop downward at its back as far as its retaining cables 51, will permit, and consequently the yoke 57 will engage with the levers 56 and throw the shields 53 downward, and also the fingers 54 of the shields, which will be carried to a vertical position and will enter the hay, keeping it from slipping from the rake. When the loading frame arrives at the position shown in Fig. 3, the lock levers 58 of the said frame will engage with the main frame, and by the time that the rake is carried over the top of the main frame the lock levers 58, will be depressed to such an extent as to release the yoke, and thereby permit it to drop upon the heels 53$^a$ of the shields 53, and raise them and their fingers 54 out of the hay, and the hay will then be free to drop downward into the wagon. When the lock levers 58 engage with the main frame the loading frame will engage with the lever 36 on the right-hand tightener arm, which may also be termed the shifting arm, and by causing that arm to drop will reverse the movement of the drum shaft, and the loading frame will be gradually lowered to the ground. In order to facilitate the downward movement of the loading frame, just after it has reached its dumping position, spring arms 60, are secured upon the main frame, and they will exert rearward pressure upon the loading frame. In this manner it will be observed that the hay may be gathered from cocks while the machine is driven over the ground, and may be loaded expeditiously and conveniently into wagons with the assistance of but few attendants, as the machine is entirely automatic in all its movements while it is being driven over the ground.

Having thus described my invention, I claim as new and desire to secure by Letters Patent—

1. In a hay loader, the combination, with a main frame adapted to stand in an upright position, and a loading frame pivotally connected with the main frame, of a rake carried by the loading frame, a driving mechanism carried by the main frame, an elevating mechanism connected with the driving mechanism and the loading frame, shifting devices connected with the driving mechanism and mechanism on the loading frame for automatically operating the shifting devices, substantially as shown and described.

2. In a hay loader, the combination, with a main frame adapted to be supported in substantially a vertical position, a loading frame having pivotal relation to the main frame, a rake carried by the loading frame, gripping fingers carried by the rake, and a trip mechanism connected with the fingers of the rake, of a driving mechanism carried by the main frame, a drum shaft driven by the driving mechanism, cables connecting the drum shaft and the loading frame, shifting devices acting upon the drum shaft through the driving mechanism, and trip devices for the shifting mechanism and the trip mechanism of the rake, the trip devices being brought into action by the movement of the loading frame, substantially as and for the purpose specified.

3. In a hay loader, the combination with a main frame adapted to be supported in a vertical position, an axle upon which the main frame is pivoted, said axle being provided with driving pulleys, and a loading frame carrying a pivotal rake, the loading frame having pivotal relation to the main frame, of a drum shaft located in the main frame, a cable connection between the drum shaft and the loading frame, a driving mechanism connected with the drum shaft, and shifting devices operated by the movement of the loading frame, the shifting devices being capable of reversing the movement of the drum shaft, substantially as shown and described.

4. In a hay loader, the combination, with a main frame, an axle upon which the frame is mounted, driving wheels connected with the axle, and driving pulleys attached to the axle, a loading frame pivoted upon the axle and of greater length than the main frame, the loading frame being adapted to have movement to and from the main frame, a rake pivotally connected with the loading frame, and trip levers connected with the rake, of a driving mechanism located in the main frame and connected with the driving pulleys on the axle, a drum shaft in gear with the driving mechanism, cables attached to the drum shaft and to the loading frame, and a shifting mechanism adapted to alternately act upon the driving belts of the driving mechanism, said shifting mechanism comprising a cam and weighted shifting arms adapted for engagement with the cam and extending in opposite directions, and tightener pulleys carried by the arms and adapted for engagement with the driving belts, the arms being actuated alternately upon the upward and downward movements of the loading frame, substantially as shown and described.

5. In a hay loader, the combination, with a main frame, an axle upon which it is pivoted, driving wheels and driving pulleys, and a rake carrying or loading frame pivoted upon the axle, of a driving mechanism located in the main frame, a drum shaft in gear with the driving mechanism, cables connecting the drum shaft with the loading frame, belts connecting one of the axle pulleys with a pulley on a driven shaft in gear with the drum shaft, the other belt connecting a second axle pulley with a pulley on the drum shaft, a shifting mechanism consisting of a cam provided with oppositely extending arms, the said cam being pivoted in the main frame, weighted shifting arms pivoted one at each side of the cam, said shifting arms carrying tightener pulleys adapted for engagement with the driving belts, and means, substantially as shown and described, for alternately actuating the shifting arms upon the upward and downward movement of the loading frame, substantially as shown and described.

6. In a hay loader, the combination, with a main frame, a driving mechanism carried by the main frame, a drum shaft in gear with the driving mechanism, and a shifting mechanism connected with the driving mechanism, whereby the movement of the drum shaft may be reversed, of a loading frame having pivotal relation with the main frame, a cable connection between the loading frame and the drum shaft, a rake pivotally carried by the loading frame, provided with fixed and movable teeth, a trip connection between the removable teeth of the rake and one section of the shifting mechanism, and a connection between the loading frame and the other section of the shifting mechanism, substantially as shown and described.

7. In a hay loader, the combination, with a frame adapted to be carried from a lower to an upper position and return, of a rake body pivotally connected with the frame, teeth fixedly secured to the rake body, a second set of teeth pivotally connected with the body, gripping fingers pivotally supported from the movable rake teeth, and a locking and trip mechanism connected with the gripping fingers, as and for the purpose specified.

FLETCHER M. BIRD.

Witnesses:
KIRK WHITED,
CHAS. H. BAKER.